United States Patent
Sebastian (10) Patent No.: US 10,649,088 B1
(45) Date of Patent: May 12, 2020

(54) ABSOLUTE OBJECT POSITION LOCATION IDENTIFICATION

(71) Applicant: DSCG SOLUTIONS, INC., Chantilly, VA (US)

(72) Inventor: Richard Sebastian, Frederick, MD (US)

(73) Assignee: DSCG Solutions, Inc., Chantilly, VA (US)

( * ) Notice: Subject to any disclaimer, the term of this patent is extended or adjusted under 35 U.S.C. 154(b) by 1081 days.

(21) Appl. No.: 14/994,992

(22) Filed: Jan. 13, 2016

Related U.S. Application Data (60) Provisional application No. 62/102,898, filed on Jan. 13, 2015, provisional application No. 62/257,523, filed on Nov. 19, 2015.

(51) Int. Cl.

| | |
|---|---|
| *G01S 17/02* | (2020.01) |
| *G01S 17/89* | (2020.01) |
| *G01S 17/10* | (2020.01) |
| *G01S 17/86* | (2020.01) |
| *G01S 17/26* | (2020.01) |

(52) U.S. Cl.
CPC ............ *G01S 17/86* (2020.01); *G01S 17/26* (2020.01); *G01S 17/89* (2013.01)

(58) Field of Classification Search
CPC ........ G01S 17/02; G01S 17/023; G01S 17/06; G01S 17/42; G01S 17/66; G01S 17/74; G01S 17/87; G01S 17/89; G01S 17/88; G01S 17/026; G01S 17/102; H04R 23/008

See application file for complete search history.

(56) References Cited

U.S. PATENT DOCUMENTS

| | | | |
|---|---|---|---|
| 8,521,412 B2 | 8/2013 | Miucic et al. | |
| 8,780,182 B2 * | 7/2014 | Byren | H04N 13/02 348/47 |
| 9,002,098 B1 * | 4/2015 | Chelian et al. | G06T 1/0014 382/153 |
| 9,435,888 B1 * | 9/2016 | Hilde | G01C 3/08 356/3.01 |
| 2003/0021309 A1 | 1/2003 | Mattox et al. | |

(Continued)

OTHER PUBLICATIONS

Smith, Philip W. et al., "Object Motion and Structure Recover for Robotic Vision Using Scanning Laser Range Sensors", IEEE Transactions on Robotics and Automation, vol. 13, No. 1, Feb. 1997, 7 pages.

*Primary Examiner* — Samantha K Abraham
*Assistant Examiner* — Amanda J Webster
(74) *Attorney, Agent, or Firm* — Brake Hughes Bellermann LLP (57) ABSTRACT

In one general aspect, a non-transitory computer-readable storage medium can be configured to store instructions that when executed cause a processor to perform a process. The process can include transmitting a plurality of laser beams at a feature on an object, and calculating a candidate shape parameter representing the feature based on a plurality of laser beams reflected from the feature. The process can include determining that the candidate shape parameter matches a measured shape parameter stored in a shape parameter database and representing a measured feature of the object, and identifying an absolute location corresponding with the measured feature of the object.

17 Claims, 3 Drawing Sheets

(56) References Cited

U.S. PATENT DOCUMENTS

| | | | |
|---|---|---|---|
| 2005/0278098 A1* | 12/2005 | Breed | G01S 13/00 |
| | | | 701/45 |
| 2007/0273863 A1 | 11/2007 | Leep et al. | |
| 2008/0046150 A1* | 2/2008 | Breed | B60Q 9/00 |
| | | | 701/45 |
| 2008/0088503 A1 | 4/2008 | Beasley | |
| 2008/0259354 A1* | 10/2008 | Gharib et al. | G01B 11/24 |
| | | | 356/601 |
| 2010/0189291 A1* | 7/2010 | Aharoni | H04R 23/008 |
| | | | 381/313 |
| 2014/0056435 A1* | 2/2014 | Kjems | H04M 9/082 |
| | | | 381/66 |
| 2014/0071121 A1* | 3/2014 | Russ | G01S 17/89 |
| | | | 345/419 |
| 2014/0111690 A1* | 4/2014 | Kim et al. | H04N 5/44 |
| | | | 348/565 |
| 2015/0022800 A1 | 1/2015 | Walsh et al. | |
| 2015/0084884 A1* | 3/2015 | Cherradi El Fadili | G06F 3/04883 |
| | | | 345/173 |
| 2016/0111091 A1* | 4/2016 | Bakish | G10L 15/30 |
| | | | 704/275 |

\* cited by examiner

| Measured Shape Parameter 410 | Feature 420 | Absolute Location 430 |
|---|---|---|
| P1 | F1 | ABS1 |
| M2 | F1 | ABS1 |
| T1 | F2 | ABS2 |
| T3 | F3 | ABS3 |
| X1 | F4 | ABS4 |
| X2 | F4 | ABS4 |
| M1 | F5 | ABS5 |

ABSOLUTE OBJECT POSITION LOCATION IDENTIFICATION

RELATED APPLICATIONS

This application claims priority to and the benefit of U.S. Provisional Patent Application No. 62/102,898, entitled "Absolute Object Position Location Identification", filed on Jan. 13, 2015, and priority to and the benefit of U.S. Provisional Patent Application No. 62/257,523, entitled "Estimation of Motion in Six Degrees of Freedom (6DoF) Using LIDAR", filed on Nov. 19, 2015, both of which are incorporated herein by reference in their entireties.

TECHNICAL FIELD

This description relates to absolute object position location identification.

BACKGROUND

In some known LIght Detection And Ranging (LIDAR) systems, lasers may be used to track an object. However, tracking of the object may be interrupted by motion of the object and/or a line-of-sight obstruction. Using the LIDAR system for re-establishing tracking of the object after such interruptions using known methods may not be effective in many applications. Thus, a need exists for systems, methods, and apparatus to address the shortfalls of present technology and to provide other new and innovative features.

SUMMARY

In one general aspect, a non-transitory computer-readable storage medium can be configured to store instructions that when executed cause a processor to perform a process. The process can include transmitting a plurality of laser beams at a feature on an object, and calculating a candidate shape parameter representing the feature based on a plurality of laser beams reflected from the feature. The process can include determining that the candidate shape parameter matches a measured shape parameter stored in a shape parameter database and representing a measured feature of the object, and identifying an absolute location corresponding with the measured feature of the object.

DETAILED DESCRIPTION

Figure 1:
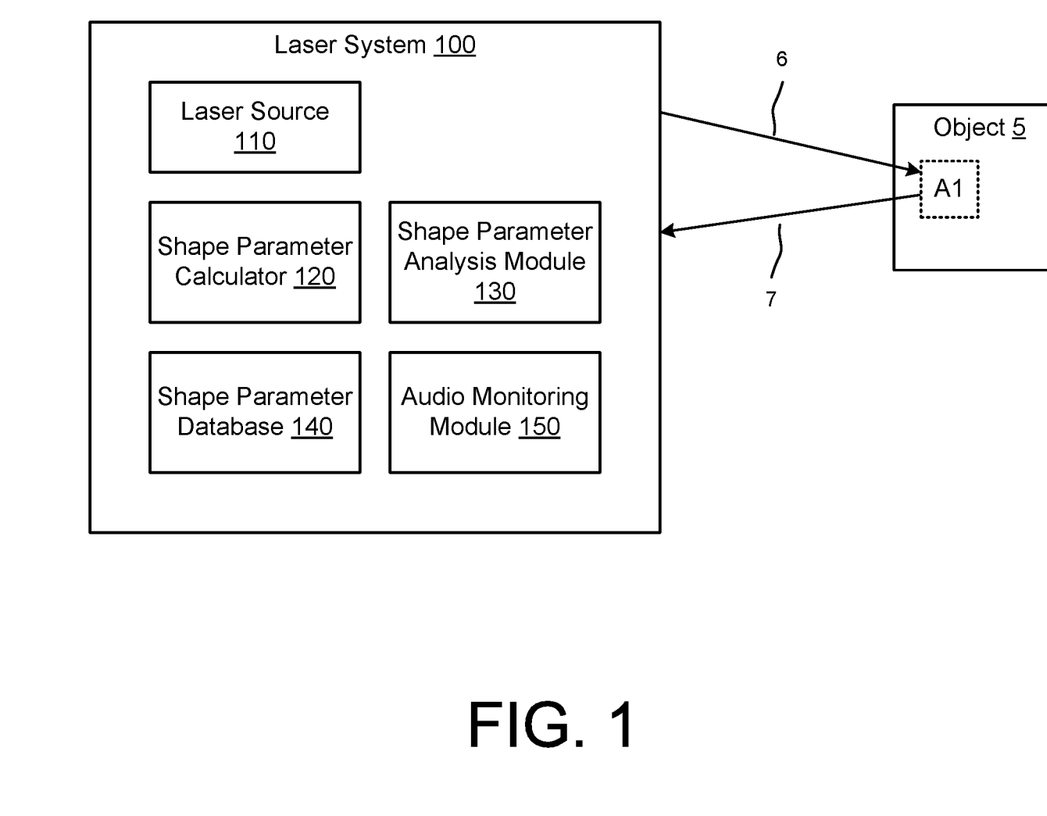
FIG. 1 is a diagram that illustrates a laser system configured to determine an absolute location within an object.

FIG. 1 is a diagram that illustrates a laser system 100 (also can be referred to as a LIght Detection And Ranging (LIDAR) system) configured to determine (e.g., uniquely determine) an absolute location within an object 5 of a set of laser beams 6 transmitted from a laser source 110 toward the object 5. Specifically, the absolute location within the object 5 of the set of laser beams 6 can be determined based on a shape of a feature, such as feature A1, toward which the set of laser beams 6 is transmitted. In some implementations, the set of laser beams 6 can include two or more laser beams (which can be referred to as an array of laser beams or a cluster of laser beams). The absolute location of the feature A1 can be determined based on processing of a set of laser beams 7 reflected from the feature A1. In some implementations, the feature can be referred to as a local feature or a local geometry. In some implementations, the number of laser beams in the set of laser beams 6 can correspond with the number of laser beams in the set of laser beams 7.

In some implementations, the object 5 can be referred to as a target or as a target object 5. The laser system 100 can be used in, for example, a frequency modulated continuous wave (FMCW) application. In some implementations, the set of laser beams 6 can be referred to as a transmitted set of laser beams or as an emitted set of laser beams. In some implementations, the set of laser beams 7 can be referred to as a reflected set of laser beams. In some implementations, the set of laser beams 6, 7 can include more than two laser beams (e.g., 5 laser beams, 8 laser beams, 10 laser beams).

Figure 2A:
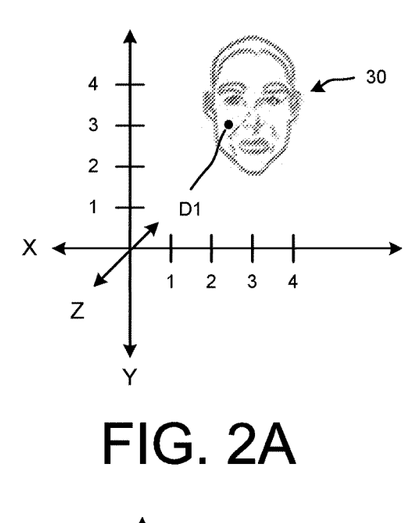
FIGS. 2A and 2B illustrate views of a feature within a head of a person.
Figure 2B:
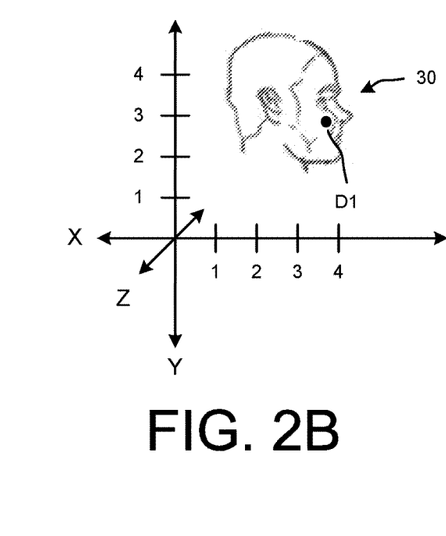

The absolute location can be a location of a feature within the object 5 that has an absolute position with respect to (e.g., an absolute position on) the object 5 or other features included in the object 5. For example, as shown in FIG. 2A, a feature D1 (which corresponds with a cheek bone) has an absolute location within a head 30 of a person. The head 30 is illustrated within a space having coordinates X, Y, and Z. Even though the orientation of the head 30 is moved to a new position within the space shown in FIG. 2B, the absolute location within the head 30 of the feature D1 is unchanged. In other words, the orientation of the feature D1 within the head 30 with respect to other features (such as a nose or eye) within the head 30 is unchanged. In some implementations, the object 5 can be considered a rigid body and the feature can have an absolute position within the rigid body of the object 5.

Referring back to FIG. 1, the identification of absolute location can be used in conjunction with a vibration monitoring operation. For example, in some implementations, vibration monitoring operations can require positioning multiple LIDAR beams on a local region of, for example, the face or neck of a person. If, for example, low latency video information is not available to guide beam positioning, then a relatively fast and efficient method implemented by the laser system 100 can be used to guide beam positioning using LIDAR information. Such processes are described in at least U.S. Provisional Patent Application No. 62/257,523, which is incorporated herein by reference in its entirety. In some implementations, the laser system 100 can be used to establish LIDAR beam location for initiation of monitoring, to confirm absolute beam location during lock-on monitoring of active subjects, and/or to reestablish absolute beam location after line-of-sight occlusion or sudden subject motion. The laser system 100 can be configured to implement rapid beam position determination with very little or minimal real-time computation.

Figure 3:
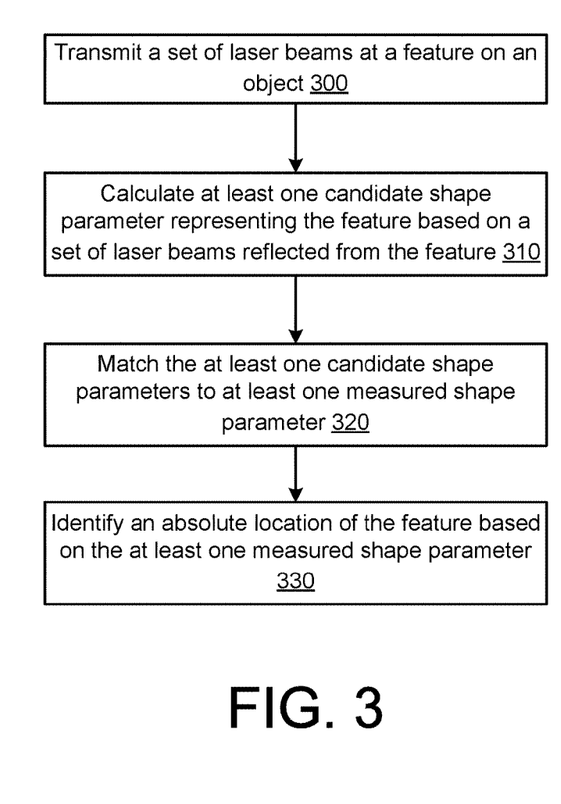
FIG. 3 is a flowchart that illustrates a process for identifying an absolute location.

The laser system 100 can be configured to identify the absolute location of the transmitted laser beams 6 using, for example, a process as outlined in FIG. 3. In some implementations, the process shown in FIG. 3 can be performed during, for example, a monitoring operation (e.g., audio monitoring operation) of an object. In some implementations, the transmitted laser beams 6 can be held at a static (or fixed) position (rather than scanning across an object or rather than a conical scanning) during the monitoring operation and during absolute location determination. The static position can be held so that audio (vibration) monitoring of the surface of the object can be more effectively performed. Laser pickup of audio signals from objects can be difficult or degraded when the object is moving. Accurately locking the laser pickup location to an absolute point on the object can improve the performance of the pickup.

As shown in FIG. 3, a set of laser beams are transmitted at a feature on an object (block 300). Using the example shown in FIG. 1, the set of laser beams can be the set of laser beams 6 transmitted toward the object 5. The feature can be, for example, the feature A1 shown in the object 5. The set of laser beams 6 can be transmitted from the laser source 110.

As shown in FIG. 3, at least one candidate shape parameter representing the feature based on a set of laser beams (or subset thereof) reflected from the feature is calculated (block 310). The set of laser beams reflected from the feature can be the set of laser beams 7 shown in FIG. 1 that are reflected from the object 5. In some implementations, at least one candidate shape parameter can be calculated using a shape parameter calculator 120 included in the laser system 100 shown in FIG. 1. In some implementations, a shape parameter can be referred to as a shape property. In some implementations, the candidate shape parameter can be a real-time estimate of a shape calculated using the set laser beams 6, 7 (or a subset thereof). In some implementations, one or more candidate shape parameters can be based on estimated range and/or estimated velocity (e.g., rotational velocity, linear velocity) calculated by the laser system 100.

In some implementations, at least one candidate shape parameter can include one or more of a variety of parameters that can be used to represent a feature. In some implementations, at least one candidate shape parameter can represent a shape of the feature or can characterize the shape of the feature. In some implementations, at least one candidate shape parameter can represent a property of a surface defining the feature or a signature (e.g., shape signature, curvature signature) of the feature.

In some implementations, at least one candidate shape parameter can be derived based on a polynomial fit of information collected using the sets of laser beams 6, 7. In some implementations, one or more coordinate(s) (e.g. Cartesian coordinates) can be calculated using the sets of laser beams 6, 7. These coordinate(s) (e.g., x, y, and z coordinates) can be used to calculate one or more polynomials representing at least a portion of a surface defining the feature.

In some implementations, at least one candidate shape parameter can be a principal axis of curvature (which can be an axis of maximum curvature), an orthogonal axis of curvature (which can be an axis of minimum curvature), an angle with respect to a vertical orientation, a Gaussian curvature, a mean curvature, and/or so forth.

In some implementations, at least one candidate shape parameter can be an intrinsic property of the feature (e.g., local surface shape) and not properties of the orientation of the feature (e.g., surface orientation). In some implementations, at least one candidate shape parameter can represent a local geometric parameter of the feature (e.g., subject surface) that does not change with orientation (e.g., subject orientation) of the object 5 and/or the dimensions of the set of laser beams 6, 7 (e.g., exact dimensions of the monitoring beam array).

After the shape parameter has been calculated, at least one candidate shape parameter can be matched to (or correlated to) at least one measured shape parameter (block 320). In some implementations, the matching of at least one candidate shape parameter can be performed using a shape parameter analysis module 130 included in the laser system 100 shown in FIG. 1. At least one measured shape parameter can be stored in a shape parameter database 140. In some implementations, at least one candidate shape parameter can be matched using a look-up in the shape parameter database 140 for at least one measured shape parameter. In some implementations, the shape parameter database 140 can be an indexed database, can include or can be a hash table, and/or so forth. In some implementations, matching of a candidate shape parameter can be a best match with one or more of the measured shape parameters included in the shape parameter database 140.

In some implementations, measured shape parameters included in the shape parameter database 140 can include a set of local geometry parameters (e.g., measured shape parameters) that can be estimates for all scanned locations of the object 5 (e.g., a subject's head). The scanned locations can be from a LIDAR system such as laser system 100. The scanned locations can include a structured light scan (e.g., a structured light face scan) and/or a stereoscopic 3D scan (e.g., a stereoscopic 3D face scan). In other words, the shape parameter database 140 can include a surface mapping of the object 5 (or portions thereof). In some implementations, the measured shape parameters included in the shape parameter database 140 can be derived from a prior scan of the object 5 (during a first monitoring operation separate from a second monitoring operation during which absolute location is being determined).

Figure 4:
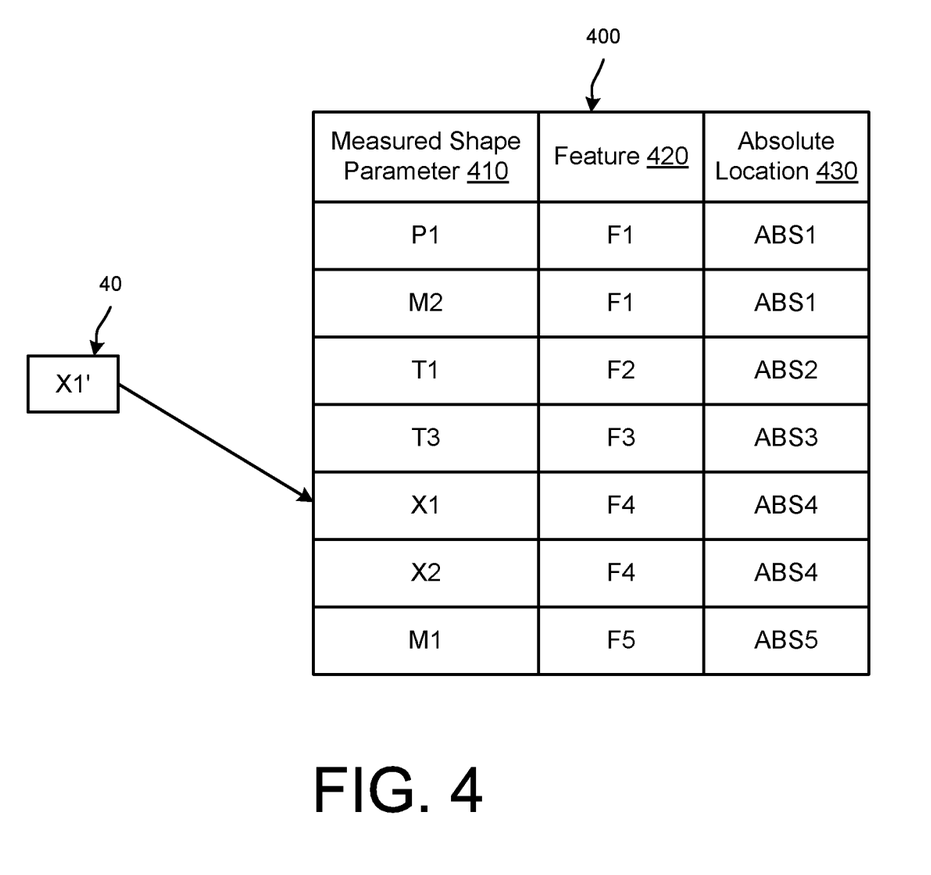
FIG. 4 is a diagram that illustrates an example of a shape parameter database associated with an object and a candidate shape parameter calculated based on the object.

FIG. 4 is a diagram that illustrates an example of a shape parameter database 400 associated with an object and a candidate shape parameter 40 calculated based on the object. As shown in FIG. 4, the shape parameter database 400 includes measured shape parameters 410 that correspond with features 420 having absolute locations 430. For example, measured shape parameters P1 and M2 correspond with feature F1 at absolute location ABS1. Accordingly, multiple shape parameters P1, M2 can be used to characterize feature F1 at absolute location ABS1. As another example, measured shape parameter T3 corresponds with absolute location ABS3.

In this example implementation, a candidate shape parameter 40 with a value of X1' is matched with measured shape parameter X1 included in the shape parameter database 400. Accordingly, the candidate shape parameter 40 is attributed as corresponding with feature F4 and being at location ABS4. In some implementations, the value of X1' of the candidate shape parameter 40 can be identical to or an exact match to the measured shape parameter X1. In some implementations, the value of X1' of the candidate shape parameter 40 can be a best match (e.g., an approximate match to) or match with one or more threshold tolerances or conditions to the measured shape parameter X1.

In some implementations, multiple candidate shape parameters can be matched with multiple shape parameters 410. In some implementations, if a candidate shape parameter is matched with several of the measured shape parameters 410 associated with several of the features 420, one or more conflict resolution algorithms can be employed to resolve which of the measured shape parameters 410 and features 420 is associated. In some implementations, the conflict resolution can include collecting additional information, identifying additional candidate shape parameters, and/or so forth.

Referring back to FIG. 3, an absolute location of the feature is identified based on at least one measured shape parameter (block 330). The absolute location can be an absolute location associated with a measured shape parameter and a feature represented by the measured shape parameter. For example, as shown in FIG. 4, the candidate shape parameter 40 having the value of X1' is matched with the measured shape parameter X1 associated with feature F4. Accordingly, the candidate shape parameter 40 is associated with and identified as having the absolute location ABS4.

In summary, in a monitoring operation, real-time estimates of local geometry parameters (of a feature) (e.g., candidate shape parameter) may be compared with the local geometry parameter map (e.g., measured shape parameters) of an object (e.g., object 5) to determine, in real time, the possible absolute position locations of the beams (e.g., sets of laser beams 6, 7). Continuity of monitoring position may be used to resolve an absolute position location ambiguity (and determine a unique absolute position) in case there is a parameter match at more than one location. In some implementations, a hashing process may be used to efficiently perform lookup of absolute monitoring beam position.

In some implementations, the method for determining an absolute location may be categorized into two stages of processing: In the first stage, a few shape parameters (e.g., candidate shape parameters) can be used to narrow a position search to one or very few potential position locations. In a second stage, a 3D registration (or 2D registration) approach such as Iterative Closest Point (ICP) can be used to refine the exact (or closest) position and resolve any ambiguities between candidate positions (e.g., locations). In some implementations, during the second stage, registration can involve calculating one or more metrics representing a degree to which point clouds are aligned. These one or more metrics can be compared for different candidate locations and the candidate with one or more metrics that meets one or more condition can be used. For example, a condition can include selection of a specific candidate location associated with the highest metric as compared metrics associated with other candidate locations, the lowest metric as compared with metrics associated with other candidate locations, and so forth. In some implementations, the 3D registration algorithm can be relatively fast and accurate, if provided a relatively close approximate starting location.

Although not illustrated in the method shown in FIG. 3, in some implementations, audio monitoring of the object can be commenced or continued upon identification of the absolute location. The audio monitoring can be targeted or moved toward the feature or another location based on the identified absolute location. For example, if at least one candidate shape parameter is identified as being associated with lips of a human face, audio monitoring at the lips can be commenced or continued. The audio monitoring can be performed using one or more sets of laser beams that may or may not be used to identify the absolute location. As another example, if at least one candidate shape parameter is identified as being associated with a cheekbone of a human face, another location relative to the cheekbone (which now has a known absolute location) can be monitored for audio.

As mentioned above, the shape parameters can include a variety of information to uniquely identify an absolute location. In some implementations, if the beam points from the sets of laser beams 6, 7 have a spatial extent so that the geometry of more than one beam position can be estimated, then, in addition to the principal curvature parameters of each location, it is possible to estimate the relative orientation of the principal curvature axes and the relative orientation of the surface normal at each of the local geometry positions.

For example, in some instances two (or more) sets of laser beams can be used to calculate at least two candidate shape parameters. At least two candidate shape parameters can be used to determine an absolute location of one or more of the sets of laser beams. In some implementations, one or more candidate shape parameter can be calculated based on portions of each of the sets of laser beams, or based on each individual set of laser beams. In some implementations, the relative orientation of one of the set of lasers beams to the other of the set of laser beams can be used as an additional shape parameter to determine an absolute location.

In some implementations, available knowledge of an orientation of an object (e.g., such as a subject head orientation) may be used to further augment a parameter set (including shape parameters) such as the approximate angles of surface normals and principal curvature axes relative to vertical. As an example, approximate object orientation (e.g., subject head orientation) may be estimated through a tracking process or through a priori assumption that an object will typically have a behavior with a particular orientation (e.g., a standing subject's head will be approximately vertical).

Referring back to FIG. 1, in some implementations, multiple different candidate shape parameters can be calculated from the sets of laser beams 6, 7. If in some implementations, one or more combinations of the multiple different candidate shape parameters cannot be matched to one or more measured shape parameters stored in the shape parameter database 140, the sets of laser beams 6, 7 can be refocused, augmented (e.g., increased surface area), contracted (e.g., decreased surface area), or repositioned to another location on the object 5. In such instances, iterative searching for an absolute position can be performed.

Specifically, the process described in connection with FIG. 3 can be iteratively performed. If a satisfactory match of a first candidate shape parameter with at least one measured shape parameter is not found, a second candidate shape parameter can be calculated based on the set of laser beams or based on information after refocusing, augmenting, contracting, or repositioning the set of laser beams. The second candidate shape parameter can be used for matching to at least one measured shape parameter. Calculation of additional candidate shape parameters can be calculated and used for matching based on refocusing, augmenting, contracting, or repositioning the set of laser beams and/or so forth until a satisfactory match is found. The identification of a satisfactory match between candidate and measure shape parameters can be based on one or more threshold conditions.

Referring back to FIG. 1, in some implementations, the laser source 110 of the laser system 100 is configured to emit (e.g., produce, propagate) electromagnetic radiation at one or more frequencies that can be, for example, a coherent light emission (e.g., monochromatic light emission) or beam. For simplicity, the emissions from the laser source 110 can be referred to as an electromagnetic radiation emission (such as electromagnetic radiation emission), an emitted laser signal, or as an emitted light. In some implementations, an emission from the laser source 110 can be associated with or can include one or more splitters, combiners, interferometers, and/or so forth (not shown) to produce the set of laser beams 6 and/or process the set of laser beams 7.

In some implementations, the laser source 110 can include, or can be associated with, one or more frequency sweep modules (not shown). The frequency sweep module can be configured to trigger the laser source 110 to produce a variety of optical frequencies (also can be referred to generally as frequencies), for example, by modulating a drive current of the laser source 110. Specifically, the frequency sweep module can be configured to trigger laser source 110 to produce a pattern of optical frequencies (also can be referred to as a frequency pattern). For example, the frequency sweep module can be configured to trigger the laser source 110 to produce a sinusoidal wave pattern of optical frequencies, a sawtooth wave pattern of optical frequencies, and/or so forth. In some implementations, the sawtooth wave pattern can have a portion continuously increasing (e.g., monotonically increasing, linearly increasing, increasing nonlinearly) in optical frequency (also can be referred to as up-chirp) and can have a portion continuously decreasing (e.g., monotonically decreasing, linearly decreasing, decreasing nonlinearly) in optical frequency (also can be referred to as down-chirp). Accordingly, the frequency pattern can have a cycle including an up-chirp and a down-chirp.

In some implementations, one or more portions of the components shown in the laser system 100 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the laser system 100 can be, or can include, a software module configured for execution by at least one processor (not shown). In some implementations, the functionality of the components can be included in different modules and/or different components than those shown in FIG. 1.

In some embodiments, one or more of the components of the laser system 100 can be, or can include, processors configured to process instructions stored in a memory. For example, the shape parameter analysis module 130 (and/or a portion thereof) can be a combination of a processor and a memory configured to execute instructions related to a process to implement one or more functions.

Although not shown, in some implementations, the components of the laser system 100 (or portions thereof) can be configured to operate within, for example, a data center (e.g., a cloud computing environment), a computer system, one or more server/host devices, and/or so forth. In some implementations, the components of the laser system 100 (or portions thereof) can be configured to operate within a network. Thus, the laser system 100 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, a memory can be any type of memory such as a random-access memory, a disk drive memory, flash memory, and/or so forth. In some implementations, the memory can be implemented as more than one memory component (e.g., more than one RAM component or disk drive memory) associated with the components of the laser system 100.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable storage medium storing instructions that when executed cause a processor to perform a process, the process comprising:
   transmitting a plurality of laser beams at a feature on an object;
   calculating at least one candidate shape parameter representing the feature based on the plurality of laser beams reflected from the feature, the calculating including generating an estimated range and estimated velocity of the object;
   determining that the at least one candidate shape parameter matches at least one measured shape parameter stored in a shape parameter database and representing a measured feature of the object;
   identifying at least one absolute location corresponding with the at least one measured feature of the object;
   continuously monitoring an acoustic vibration at a location within the object based on the at least one absolute location, the continuous monitoring being performed in response to the determining that the at least one candidate shape parameter matches the at least one measured shape parameter; and
   in response to more than one candidate shape parameter matching the at least one measured shape parameter, performing, during the performance of the continuous monitoring, absolute position resolution operation to produce a unique absolute position.

2. The non-transitory computer-readable storage medium of claim 1, further comprising:
   determining the absolute location within the object of the feature corresponding with the candidate shape parameter.

3. The non-transitory computer-readable storage medium of claim 1, wherein the candidate shape parameter is a first candidate shape parameter, the feature is a first feature,
   the process further comprising:
   defining a second candidate shape parameter representing a second feature on the object based on the plurality of laser beams reflected from the second feature; and
   determining that the second candidate shape parameter is not matched to the measured shape parameter,
   the determining that the first candidate shape parameter matches the measured shape parameter is performed after determining that the second candidate shape parameter is not matched to the measured shape parameter.

4. The non-transitory computer-readable storage medium of claim 1, wherein the candidate shape parameter is a first candidate shape parameter, the feature is a first candidate feature,
   the process further comprising:
   defining a second candidate shape parameter representing a second feature on the object based on the plurality of laser beams reflected from the second feature; and
   determining that the second candidate shape parameter does not satisfy a threshold condition,
   the determining that the first candidate shape parameter matches the measured shape parameter is performed after determining that the second candidate shape parameter does not satisfy the threshold condition.

5. The non-transitory computer-readable storage medium of claim 1, wherein the candidate shape parameter represents a surface curvature calculated based on coordinate values.

6. The non-transitory computer-readable storage medium of claim 1, wherein the determining that the candidate shape parameter matches the measured shape parameter is based on a look-up in the shape parameter database.

7. The non-transitory computer-readable storage medium of claim 1, wherein the plurality of laser beams reflected from the feature define a laser beam array.

8. The non-transitory computer-readable storage medium of claim 1, further comprising:
   performing a LIght Detection And Ranging (LIDAR) scan of the object, the measured shape parameter is derived from the scan of the object.

9. The non-transitory computer-readable storage medium of claim 1, wherein the object is approximated as a rigid body, and the absolute location is within a surface of the object.

10. The non-transitory computer-readable storage medium of claim 1, wherein the velocity includes a rotational velocity.

11. The non-transitory computer-readable storage medium of claim 1, wherein performing the absolute position resolution operation includes performing an iterative closest point operation.

12. A method, comprising:
    transmitting a plurality of laser beams toward an object;
    calculating a plurality of candidate shape parameters representing a plurality of candidate features of the object based on the plurality of laser beams reflected from the object;
    comparing at least a portion of the plurality of candidate shape parameters with a plurality of measured shape parameters stored in a memory and representing a plurality of features of the object;
    identifying at least one absolute location within the object of a feature from the plurality of features in response to the comparing; and
    continuously monitoring an acoustic vibration at the at least one absolute location, the continuous monitoring of the acoustic vibration being performed in response to the determining that a candidate shape parameter matches the at least one measured shape parameter; and
    in response to there being more than one absolute location identified, performing, during the performance of the continuous monitoring, an absolute position resolution operation to produce a unique absolute position.

13. The method of claim 12, wherein the plurality of candidate shape parameters includes an axis of curvature representing at least a portion of a candidate feature from the plurality of candidate features.

14. The method of claim 12, wherein the plurality of candidate shape parameters includes a curvature representing at least a portion of a candidate feature from the plurality of candidate features.

15. The method of claim 12, wherein the plurality of candidate shape parameters includes a polynomial representing at least a portion of a candidate feature from the plurality of candidate features.

16. The method of claim 12, wherein the plurality of measured shape parameters are defined based on a scan of the object performed before the calculating the plurality of candidate shape parameters.

17. The method as in claim 12, wherein identifying the absolute location within the object of the feature from the plurality of features includes:
   identifying a plurality of potential locations within the object of the feature; and
   performing a registration operation to resolve ambiguities between the plurality of potential locations within the object and refine to produce a more accurate absolute location within the object of the feature.

* * * * *